March 8, 1927. 1,620,369
J. A. McKAY ET AL
LOCK FOR THE WHEELED AXLES OF STALK CUTTERS AND OTHER
WHEELED AGRICULTURAL IMPLEMENTS
Filed Jan. 29, 1926  2 Sheets-Sheet 1
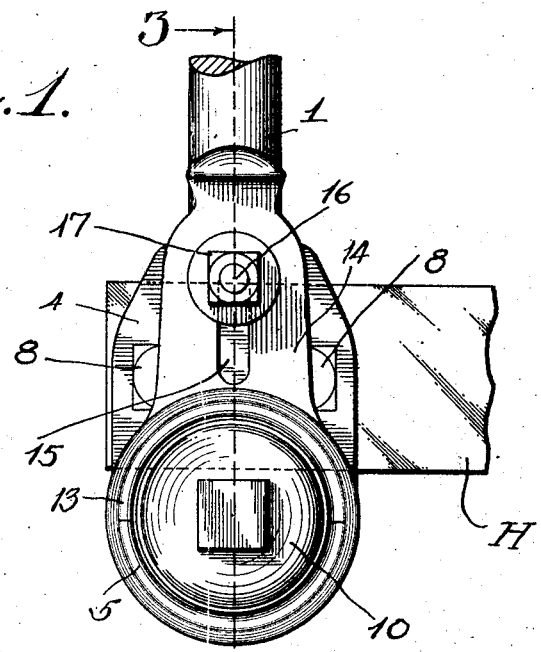
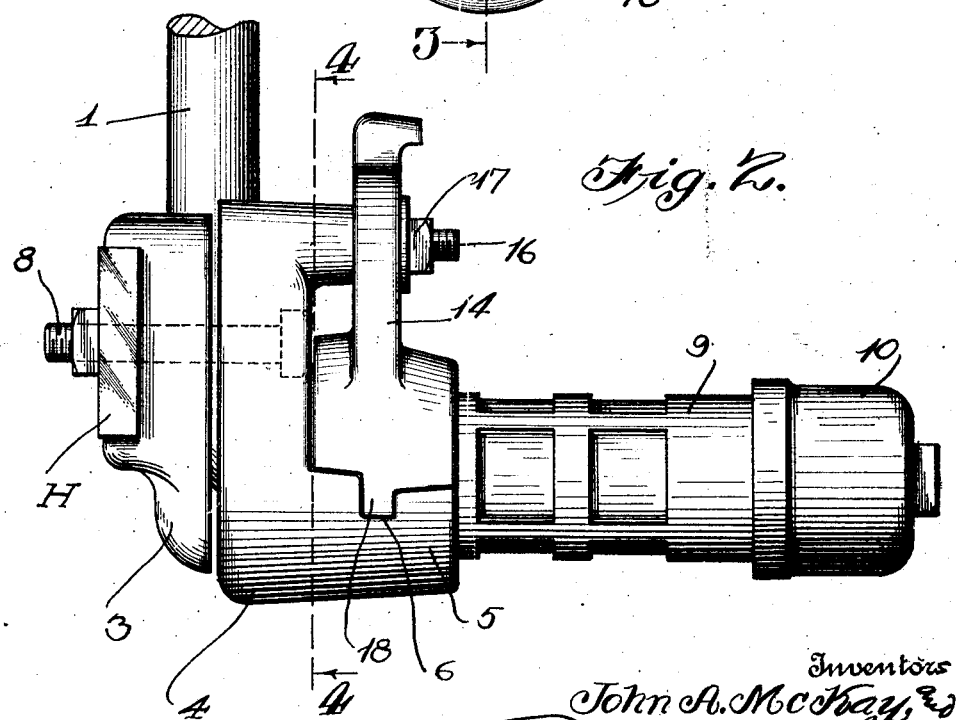

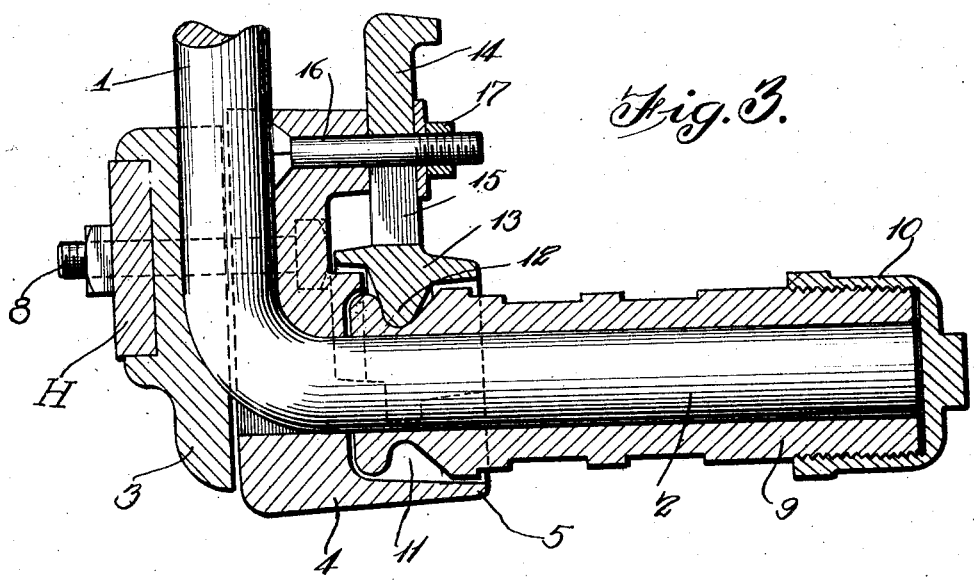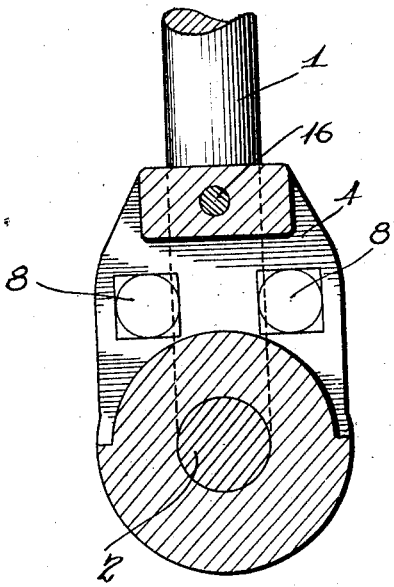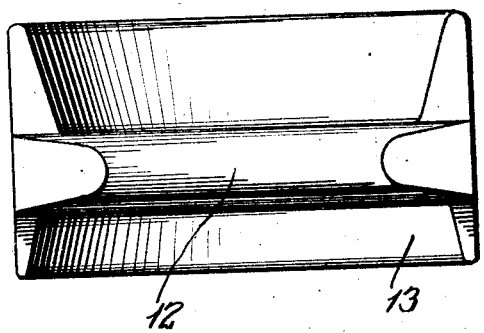

Patented Mar. 8, 1927.

1,620,369

UNITED STATES PATENT OFFICE.

JOHN A. McKAY AND PATRICK H. LYNCH, OF DUNN, NORTH CAROLINA, ASSIGNORS TO THE JOHN A. McKAY MANUFACTURING COMPANY, INC., OF DUNN, NORTH CAROLINA, A CORPORATION OF NORTH CAROLINA.

LOCK FOR THE WHEELED AXLES OF STALK CUTTERS AND OTHER WHEELED AGRICULTURAL IMPLEMENTS.

Application filed January 29, 1926. Serial No. 84,688.

This invention relates to an improvement in locks for the wheeled axles of stalk-cutters and other wheeled agricultural implements.

The object is to provide a simple means of locking the wheel-box of the ground wheels upon the axle.

In the accompanying drawings:

Fig. 1 is a view looking toward one end of the wheel-box;

Fig. 2 is a view at right-angles to Fig. 1;

Fig. 3 is a section on line 3—3 of Fig. 1;

Fig. 4 is a section on line 4—4 of Fig. 2; and

Fig. 5 is a bottom plan view of the lock.

The letter H represents the side frame of the machine, and the numeral 1 represents the axle, which is bent horizontally at the lower end to form the spindle 2. At the angle, the axle is held rigidly to the main frame by the two clamp castings 3 and 4; and these are held together by a pair of bolts 8. These castings surround the curvature of the axle in such a manner as to strengthen the same at that point. The casting 4 is provided at the lower edge with a horizontal flange 5, which is concentric with the spindle 2, and is provided on opposite sides with the notches 6 shown in full lines in Figs. 2 and 4, and in dotted lines in Fig. 3.

This flange 5 forms a housing beneath the inner end of the wheel-box 9, as shown in Figs. 2 and 3, when the box is mounted on the spindle 2. The wheel (not shown) is secured to the box, and a dust-cap 10 is screwed on the outer end of the box.

The box is provided at its inner end with a circumferential groove 11, and in this groove the curved tongue 12 of the lock 13 extends. This tongue 12 extends about half round a circle (as shown in Fig. 5) in order to hold the box on the axle. A shank 14 having a slot 15 extends upwardly from the lock 13, and a bolt 16 extends from the upper end of the casting 4 through this slot, and the nut 17 on the bolt 16 holds the lock securely in place. Lugs 18 at opposite sides enter the notches 6 in the flange 5 when the lock is down, and between these lugs 18 and the bolt 16 and nut 17, the lock is held rigidly in place against the possibility of the wheel-box pulling out.

Thus an effectual lock is provided for the wheel of any wheeled agricultural implement, such as stalk-cutters, cultivators, grain planters, and other wheeled vehicles.

One of the primary advantages is that when it is desired to remove a wheel for greasing, it is a very simple job to loosen the nut 17 and raise lock 13, and pull the wheel off, and after replacing the same by reversing the order, it is again secured in position, the lock being located at an accessible point to the operator where it will be unnecessary to reach far into the machine in order to release the wheel from the axle.

We claim:

1. A device of the character described including an axle having a portion bent at an angle thereto, castings secured together substantially at the angle, a wheel-box adapted to be mounted on the axle and having a circumferential groove, a lock having a tongue adapted to enter the groove, the lock having a slotted shank, and a bolt extending from at least one of the castings through said slot, and a nut on the bolt for securing the lock in locked position.

2. A device of the character described including an axle having a portion bent at an angle thereto, castings surrounding the axle at the angle and removably secured together, a wheel-box rotatably mounted on the axle, a movable lock with which the wheel-box has interlocking rotatable connection, and means connected with the castings for securing the lock in locked position.

3. A device of the character described including an axle having a portion bent at an angle thereto, castings secured together at the angle, a wheel box adapted to be mounted on the axle and having a circumferential groove, a lock having a tongue in position to enter the groove, and means carried by one of the castings for securing the lock in locked position.

4. A device of the character described including an axle, a casting secured thereto and having a notched flange, a wheel-box having a circumferential groove, a lock having a tongue adapted to enter the groove, and lugs adapted to enter the notches in the flange, the lock having a slotted shank, and a bolt extending from the casting through the said slot, and a nut on the bolt for securing the lock in locked position.

5. A device of the character described including an axle having a portion bent at an angle thereto, castings secured together adjacent the angle, a wheel-box adapted to be mounted on the axle, a lock for said wheel-box having a slotted shank, and a bolt extending from the castings into the slotted shank for securing the lock in locked position.

6. A device of the character described including an axle, a wheel-box adapted to be mounted on the axle, a lock for engaging the wheel-box and having a slotted shank, supporting means, and a bolt extending from the supporting means into the slotted shank to secure the lock in locked position.

7. A device of the character described including an axle, a wheel-box adapted to be mounted on the axle, a lock for engaging the wheel-box, and having a slotted shank extending outwardly therefrom, supporting means having a notch formed therein, a lug extending from the lock into the supporting means, and a bolt extending outwardly from the supporting means into the slotted shank for securing the lock in its locked position.

In testimony whereof we affix our signatures.

JOHN A. McKAY.
PATRICK H. LYNCH.